United States Patent
Klos et al.

(10) Patent No.: US 7,997,801 B2
(45) Date of Patent: Aug. 16, 2011

(54) LINEAR ROLLING BEARING

(75) Inventors: Peter Klos, Freisen (DE); Peter Heipt, St. Ingbert (DE); Wolfgang Bauer, Riegelsberg (DE)

(73) Assignee: Schaeffler KG, Herzogenaurach (DE)

( * ) Notice: Subject to any disclaimer, the term of this patent is extended or adjusted under 35 U.S.C. 154(b) by 477 days.

(21) Appl. No.: 12/094,097

(22) PCT Filed: Nov. 14, 2006

(86) PCT No.: PCT/EP2006/068424
§ 371 (c)(1),
(2), (4) Date: Jun. 26, 2008

(87) PCT Pub. No.: WO2007/057383
PCT Pub. Date: May 24, 2007

(65) Prior Publication Data
US 2008/0317390 A1 Dec. 25, 2008

(30) Foreign Application Priority Data
Nov. 19, 2005 (DE) .................... 10 2005 055 194

(51) Int. Cl.
*F16C 29/06* (2006.01)
(52) U.S. Cl. .................... 384/45; 29/898.03
(58) Field of Classification Search .......... 384/43–45; 29/898.03
See application file for complete search history.

(56) References Cited

U.S. PATENT DOCUMENTS

| | | | | |
|---|---|---|---|---|
| 5,076,713 | A | * | 12/1991 | Morita .................... 384/45 |
| 5,085,522 | A | * | 2/1992 | Hattori et al. .................... 384/45 |
| 5,217,308 | A | * | 6/1993 | Schroeder .................... 384/45 |
| 5,851,073 | A | * | 12/1998 | Takeuchi .................... 384/45 |
| 6,517,245 | B2 | * | 2/2003 | Luo et al. .................... 384/45 |
| 7,229,212 | B2 | * | 6/2007 | Takeuchi .................... 384/45 |

FOREIGN PATENT DOCUMENTS

| | | |
|---|---|---|
| DE | 7149049 Y | 4/1972 |
| DE | 3527886 A | 4/1987 |
| DE | 4238910 Y | 5/1994 |
| DE | 19502498 Y | 8/1996 |
| DE | 19525219 A | 1/1997 |
| DE | 19615722 A | 10/1997 |
| DE | 10052848 A | 5/2002 |
| DE | 102004031028 | 1/2006 |
| EP | 1517056 A | 3/2005 |
| JP | 2005003158 Y | 1/2005 |
| JP | 2005291248 Y | 10/2005 |

* cited by examiner

*Primary Examiner* — Thomas R Hannon
(74) *Attorney, Agent, or Firm* — Lucas & Mercanti, LLP

(57) ABSTRACT

Linear roller bearing, for carriage (1) which is longitudinally displaceable along rail (2). Carriage (1) has an endless channel (8) for endless circulation of rolling bodies (9). Channel (8) has load section (10), return section (11) and two deflection sections (12) which connect load section (10) to return section (11). Rolling bodies (9) roll in load section (10) on raceways (10*a*, 10*b*), and returned, without load, in return section (11). Bodies (9) are deflected in deflection sections (12) between load section (10) and return section (11). Deflection sections (12) have one inner deflection means (14) with inner deflection race (16) and outer deflection means (13) with outer deflection race (15). Inner deflection means (14) and outer deflection means (13) are connected, integrally to one another.

13 Claims, 2 Drawing Sheets

LINEAR ROLLING BEARING

FIELD OF THE INVENTION

The present invention relates to a linear roller bearing, in which a guide carriage can be guided in a longitudinally displaceable manner on a guide rail.

BACKGROUND OF THE INVENTION

For example, DE 44 13 373 has disclosed a linear roller bearing, in which a guide carriage is arranged longitudinally displaceably on a guide rail. The guide carriage is provided with a plurality of endless rolling body channels for endless circulation of rolling bodies. Each rolling body channel comprises a load section, a return section and two deflection sections which connect the load section to the return section. In the load section, the rolling bodies roll on raceways of the guide rail and the guide carriage. In the return section, the rolling bodies are returned without load. In the deflection sections, the rolling bodies are deflected from the load section into the return section or vice versa. Each deflection section has an inner deflection means which is provided with an inner deflection race and an outer deflection means which is provided with an outer deflection race. The outer deflection means is integrally formed from plastic on a head piece of the guide carriage. The inner deflection means is formed on a separate plastic piece which, like the head piece, is fastened on the end side to a supporting body of the guide carriage. The circulating rolling bodies exert considerable centrifugal forces on the deflection sections, in particular at high circulating speeds. If, for example, the inner deflection means is not fastened satisfactorily, an undesired offset between the inner deflection means and the outer deflection means can be the consequence. Furthermore, during assembly of the guide carriage, satisfactory positioning both of the inner deflection means and of the outer deflection means already has to be ensured for satisfactory circulation of the rolling bodies.

It is an object of the present invention to specify a linear roller bearing according to the precharacterizing clause of claim 1 which can be produced simply and ensures satisfactory deflection of the rolling bodies in the deflection sections.

SUMMARY OF THE INVENTION

According to the invention, this object is achieved in that the inner deflection means and the outer deflection means of the deflection section are connected integrally to one another. The number of parts is reduced and alignment of the inner deflection means and the outer deflection means with respect to one another is omitted. In this way, a linear roller bearing is provided which can be produced more simply than the known linear roller bearings, satisfactory guiding of the rolling bodies being ensured in the deflection section.

The deflection sections can be formed in each case on one head piece and the load sections can be formed on one supporting body of the guide carriage, the head piece being connected integrally to the respective deflection section. Apart from seals which possibly have to be provided, a compact head piece can therefore be formed which can be placed at the end side on the supporting body of the guide carriage, without it being necessary for a large number of individual parts to be mounted.

In a known way, the approximately U-shaped guide carriage can be provided with two limbs for engaging around the guide rail, at least one, preferably two load sections of the endless rolling body channel which are arranged parallel to one another being provided on each limb, the approximately U-shaped head pieces having in each case two limb sections which are connected integrally to one another via a connecting section.

One, preferably two deflection sections can be formed integrally on each limb section.

If linear roller bearings according to the invention are exposed to beta radiation, an undesirable acceleration of the aging process of the plastic which is used for the deflection sections can be the consequence. In this case, one development according to the invention provides for the deflection sections to be formed from a metal which is more suitable than plastic for this use condition.

One favorable development according to the invention provides the combination of deflection sections which are formed from metal with production of said deflection sections by precision casting. Highly accurate products can be produced by the precision casting process.

A production method of a linear roller bearing according to the invention provides for the supporting body and the head pieces to be produced separately and to be formed from metal, each deflection section being produced by the precision casting process. Here, the head pieces can be connected integrally to the respective deflection sections.

A highly accurate head piece can be produced by way of the following method: first of all, a model of the head piece is produced from a material which melts at a low temperature in comparison with steel. This model is then coated by a fire-resistant coating mass, preferably by a ceramic mass. After setting or solidification of this coating mass, the model is embedded into a molding material and is fired together with the molding material. The material of the model with a low melting point is melted by means of this firing process with the release of a mold cavity. Finally the molten metal which forms the head piece is poured into the mold cavity. When this molten metal has solidified, the fired molding material and the coating mass are removed with the release of the head piece which is then solidified. This head piece which is formed in this way can be flange-connected to the supporting body of the guide carriage, optionally without further machining.

The model can first of all be composed of a plurality of parts, this model forming the approximately U-shaped head piece which has in each case two limb sections which are connected to one another via a connecting section, each limb section having at least one deflection section with an inner deflection means and an outer deflection means.

BRIEF DESCRIPTION OF THE DRAWINGS

In the following text, the invention will be explained in greater detail using an exemplary embodiment which is depicted in a total of four figures, in which.

DETAILED DESCRIPTION OF THE DRAWINGS

Figure 1:
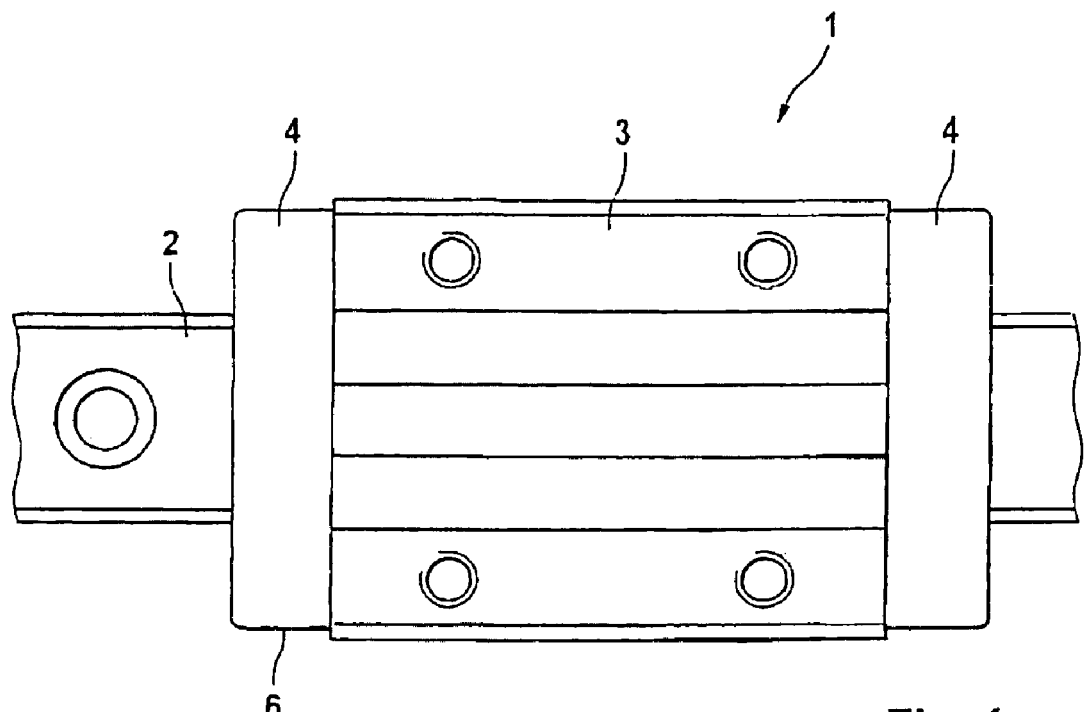
FIG. 1 shows a plan view of a linear roller bearing according to the invention.

The linear roller bearing according to the invention which is depicted in FIGS. 1 to 4 has a guide carriage 1 which is guided longitudinally displaceably on a guide rail 2. The guide carriage 1 comprises a supporting body 3 and head pieces 4 which are flange-connected on the end side to the supporting body 3.

By way of its two limbs 5, the guide carriage 1 which is of approximately U-shaped configuration engages around the guide rail 2 at its two longitudinal sides. Each head piece is provided with corresponding limb sections 6 and a connecting section 7 which connects the two limb sections 6.

Figure 2:
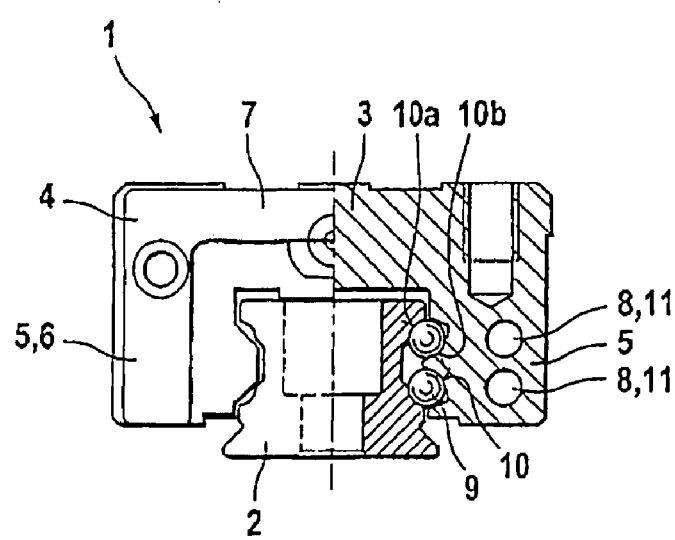
FIG. 2 shows a cross section through the linear roller bearing according to the invention, and FIGS. 3, 4 in each case show a part of the linear roller bearing according to the invention in different sections.

The guide carriage 1 is provided with four endless rolling body channels 8, of which in each case two lie above one another and are formed on a limb 5 of the guide carriage 1. Rolling bodies 9 which are formed by balls circulate endlessly in each rolling body channel 8. The rolling body channel 8 has a load section 10, a return section 11, and two deflection sections 12 which connect the return section 11 to the load section 10. The load section 10 and the return section 11 are depicted in FIG. 2. The two deflection sections 12 of a limb 5 are depicted clearly in FIGS. 3 and 4.

Figure 3:
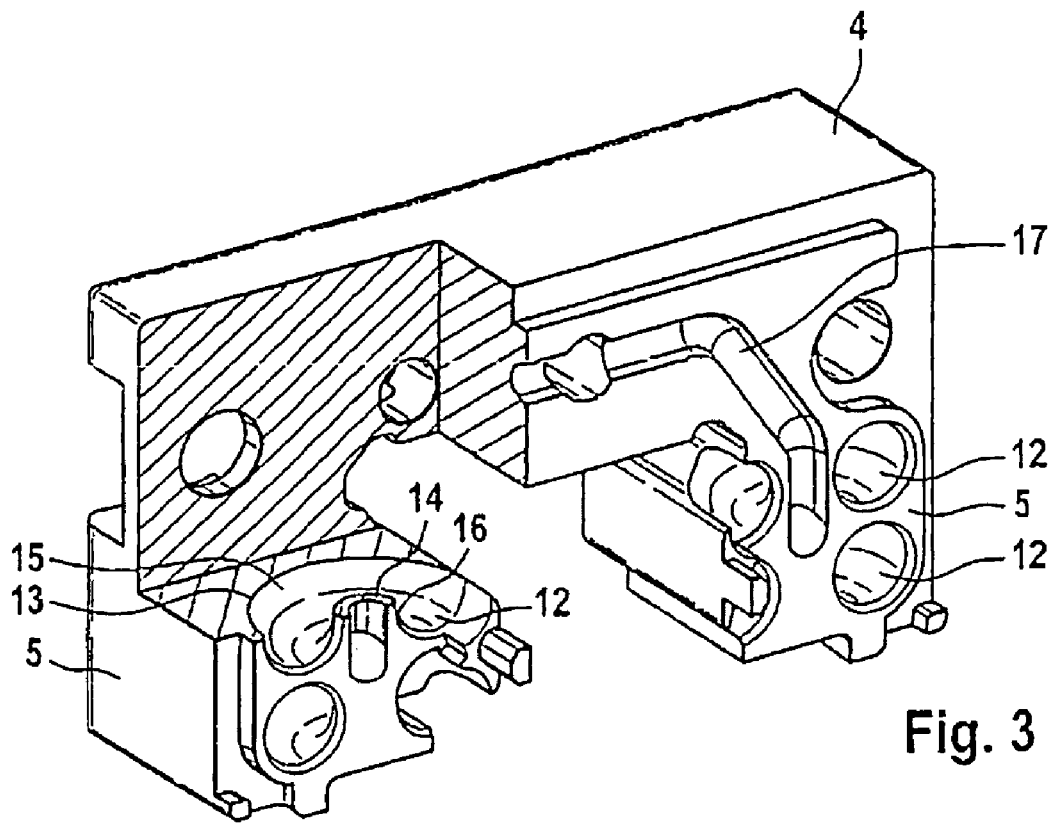
Figure 4:
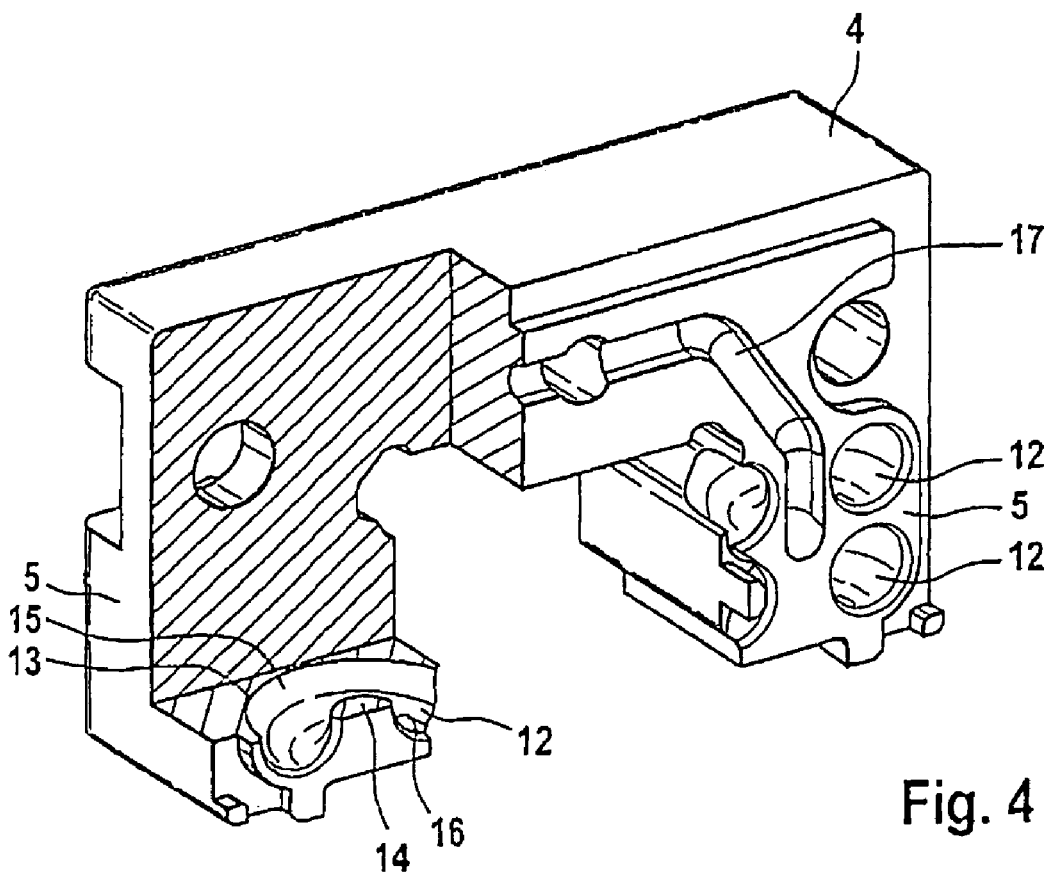

FIGS. 3 and 4 depict a head piece 4, the different sectional depictions showing sections through the two deflection sections 12 of one of the two limbs 5. The head piece 5 is produced completely from metal by the precision casting process. In the precision casting process, a large number of steels can be used, for example case hardened steels, tempering steels, nitrided steels, tool steels, high-speed steels, stainless and acid-resistant steels and also nonferrous metals.

It can be gathered clearly from FIGS. 3 and 4 that each deflection section has an outer deflection means 13 and an inner deflection means 14, the outer deflection means 13 being provided with an outer deflection race 15 and the inner deflection means 14 being provided with an inner deflection race 16. The outer deflection means 13 and the inner deflection means 14 are produced integrally by the precision casting process and are connected to one another.

Furthermore, the head piece 4 is provided with lubricant channels 17, in order to introduce lubricant into the region of the endless rolling body channel 8.

The integral production of the head piece 4 with the deflection sections 12 ensures satisfactory alignment of the inner deflection means 14 and the outer deflection means 13 with respect to one another, with the result that the rolling bodies 5 can be deflected satisfactorily, in particular in the deflection sections 12. The use of steel as material for the head pieces 4 is suitable, in particular, if linear roller bearings according to the invention are exposed to, for example, beta radiation.

LIST OF REFERENCE NUMERALS

1 Guide carriage
2 Guide rail
3 Supporting body
4 Head piece
5 Limb
6 Limb section
7 Connecting section
8 Rolling body channel
9 Ball
10 Load section
10a Raceway
10b Raceway
11 Return section
12 Deflection section
13 Outer deflection means
14 Inner deflection means
15 Outer deflection race
16 Inner deflection race
17 Lubricant channel

The invention claimed is:

1. A linear roller bearing assembly, comprising:
a guide carriage, which is suitable for longitudinally displaceable guidance along a guide rail, which guide carriage has an endless rolling body channel for endless circulation of rolling bodies, which rolling body channel has a load section, a return section and two deflection sections which connect the load section to the return section, it being possible for the rolling bodies to roll in the load section on raceways, to be returned without load in the return section and to be deflected in the deflection sections between the load section and the return section, the deflection sections, which are single unitary elements, each having one inner deflection means which has an inner deflection race and an outer deflection means which has an outer deflection race,
wherein the inner deflection means and the outer deflection means of the deflection section are a single unitary element,
wherein the guide carriage comprises a supporting body and head pieces which are connected on each end side of the supporting body, and
wherein the deflection sections are formed on the headpieces and the load sections are formed on the supporting body, each head piece being integral with a respective one of deflection sections.

2. The linear roller bearing assembly according to claim 1, wherein the head pieces, which together with the supporting body forms the guide carriage, are each approximately U-shaped.

3. The linear roller bearing assembly according to claim 1, wherein head pieces each have two limb sections which are connected integrally to one another via a connecting section so as to engage around the guide rail, each of the limb sections having at least one load section.

4. The linear roller bearing assembly according to claim 3, wherein at least one deflection section is formed integrally on each limb section.

5. The linear roller bearing assembly according to claim 4, wherein two deflection sections are formed integrally on each limb section.

6. The linear roller hearing assembly according to claim 3, wherein two load sections are formed integrally on each limb section.

7. The linear roller bearing assembly according to claim 1, wherein the deflection sections are formed from metal.

8. The linear roller bearing assembly according to claim 7, wherein the deflection sections are produced by precision casting.

9. A method for producing a linear roller bearing having a guide carriage, which is suitable for longitudinally displaceable guidance along a guide rail, which guide carriage has an endless rolling body channel for endless circulation of rolling bodies, which rolling body channel has a load section, a return section and two deflection sections which connect the load section to the return section, it being possible for the rolling bodies to roll in the load section on raceways, to be returned without load in the return section and to be deflected in the deflection sections between the load section and the return section, the deflection sections, each having one inner deflection means which has an inner deflection race and an outer deflection means which has an outer deflection race, wherein the inner deflection means and the outer deflection means of the deflection section are connected integrally to one another, wherein the deflection sections are formed in each case on one head piece and the load sections are formed on one supporting body of the guide carriage, the head piece being connected integrally to the respective deflection section, wherein the supporting body and the head pieces are produced separately and are formed from metal, and each deflection section is produced by a casting process.

10. The method according to claim 9, wherein the head piece is connected integrally to the deflection section and is produced by the casting process.

11. The method according to claim 10, wherein a model of the head piece is produced from a material which melts at a low temperature in comparison with steel, is coated by a fire-resistant coating mass and, after setting or solidification of the coating mass, is embedded into a molding material and is fired with the molding material, the material of the model with a low melting point melting by means of the firing process with a release of a mold cavity, and a molten metal which forms the head piece being poured into the mold cavity, and the fired molding material and the coating mass being removed with the release of the solidified head piece.

12. The method according to claim 11, wherein the model, which is formed from a plurality of parts, forms the head pieces which each have two limb sections which are connected to one another via a connecting section, each limb section having at least one deflection section with an inner deflection means and an outer deflection means.

13. The method according to claim 11, wherein the fire-resistant coating mass is a ceramic mass.

* * * * *